Patented Sept. 25, 1951

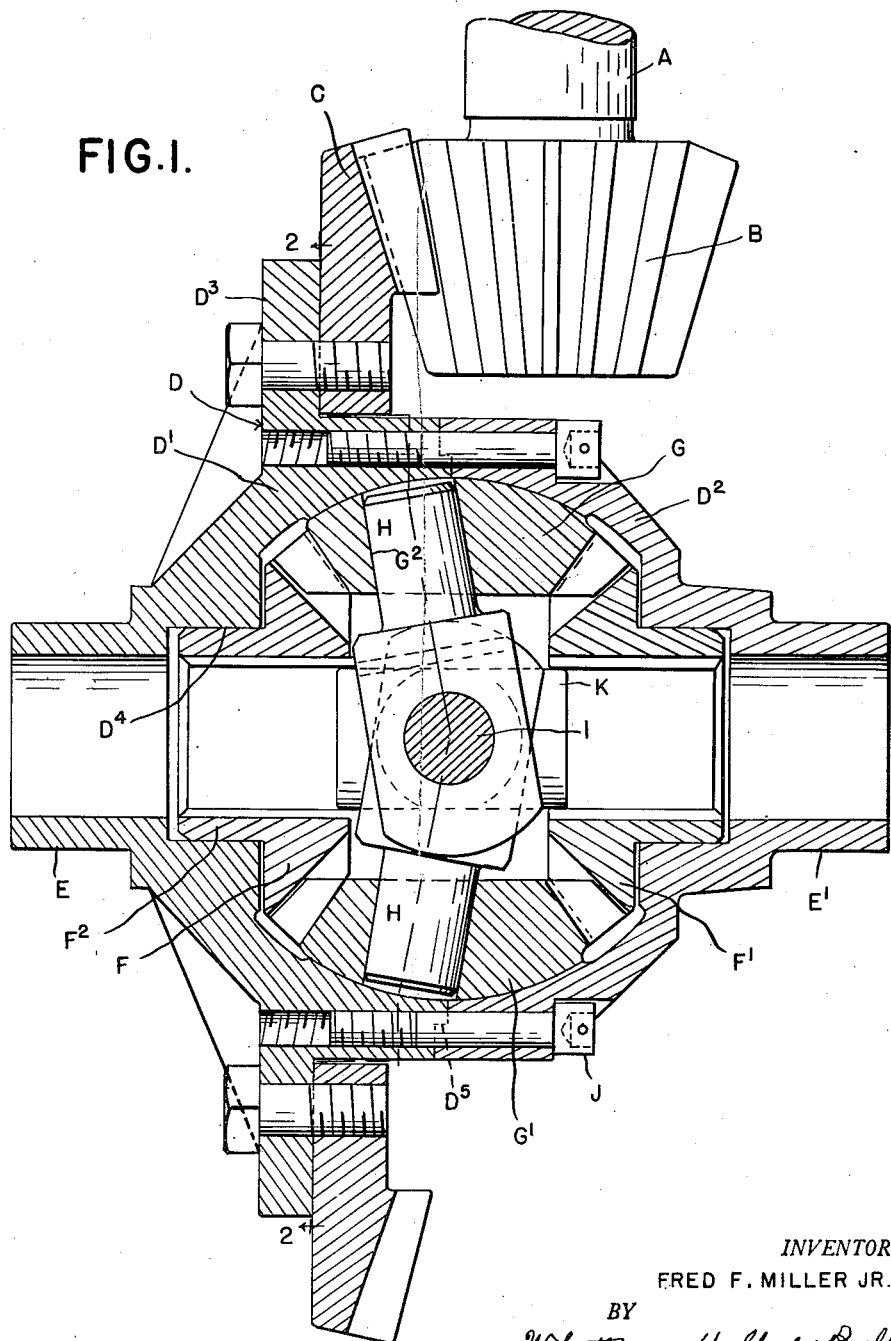

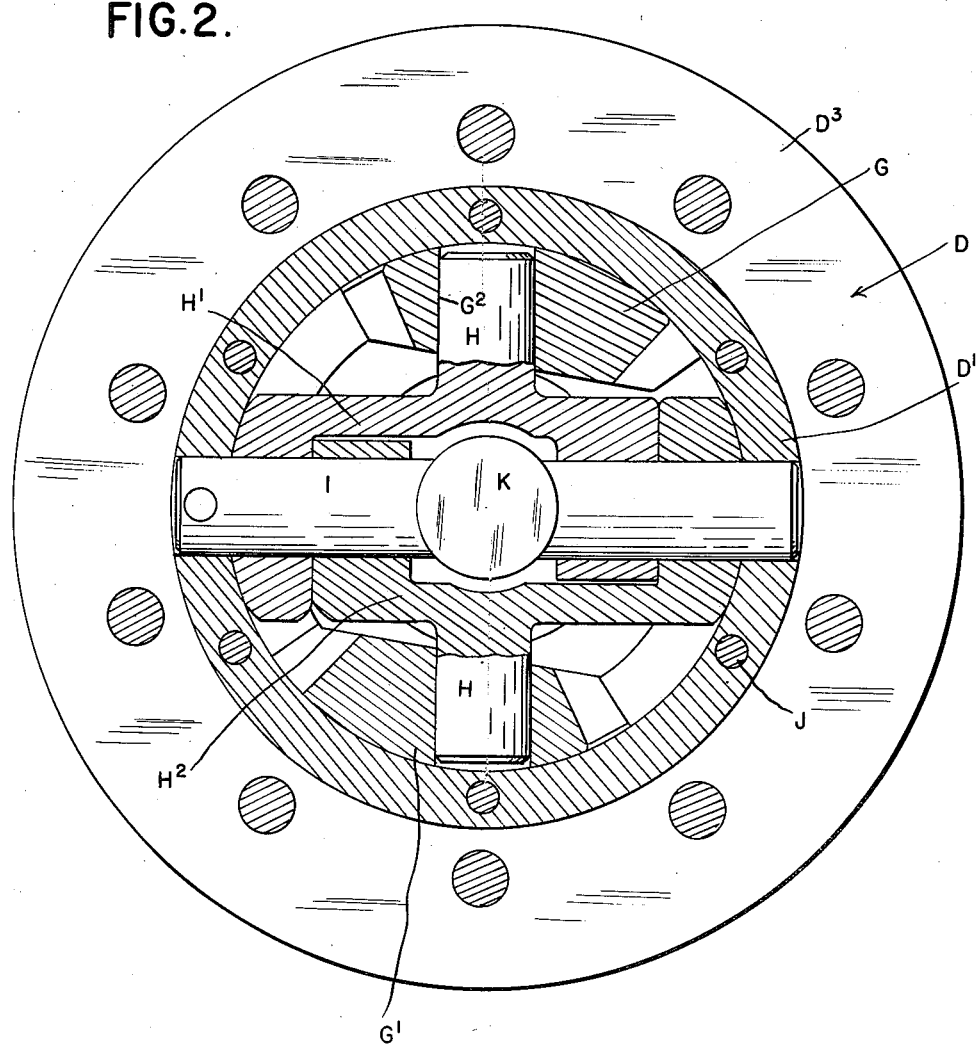

2,569,015

UNITED STATES PATENT OFFICE 2,569,015

DIFFERENTIAL GEARING

Fred F. Miller, Jr., Berkley, Mich., assignor to The Gear Grinding Machine Company, Hamtramck, Mich., a corporation of Michigan Application May 17, 1948, Serial No. 27,440

2 Claims. (Cl. 74—711)

The invention relates to differential gearings of that type in which a differential torque is transmitted from the driving to the driven members when the gearing is differentiating.

It is the object of the invention to obtain a simplified structure of this type which is capable of transmitting relatively high torques without unduly stressing any of the elements.

It is a further object to obtain a construction in which wear of the parts is minimized. With these objects in view the invention consists in the construction as hereinafter set forth.

In the drawings:

Fig. 1 is a cross-section in the plane of the axis of the driven members showing the torque transmitting pinion;

Fig. 2 is a section on line 2—2, Fig. 1.

A is the propeller shaft, B the pinion thereon and C the ring gear in mesh with the pinion, such as used in motor vehicle axle driving members. D is the differential gearing housing formed of complementary half sections D' and D², the ring gear C being mounted on a flange D³ of the housing member D'. E and E' are the hub bearings on the housing members D' and D² for supporting said housing for rotation in any suitable mounting. F and F' are beveled gear wheels for mounting on the axle shafts (not shown), each of these having a hub portion F² journaled in a bearing D⁴ of its corresponding housing section. G and G' are pinions intermediate and intermeshing with the gear wheels F and F', which are arranged on diametrically opposite sides of the latter. Each of these pinions is provided with an eccentrically disposed aperture G² therein forming a journal bearing, the axis of which is inclined to the axis of rotation of the pinion so that both will intersect at a common point in the axis of the driven shafts. H are axles or journals for engagement with the apertures G² of the respective pinions G and G'. These journals are formed integral with bifurcated members H' and H², which latter are revolubly mounted on a shaft I extending diametrically across the housing member D. The axis of this shaft I is perpendicular to the axes of the journals H and the furcations of the members H' and H² are adjacent to each other on opposite sides of the shaft I. The inner surface of the housing members D' and D² is of spherical form with the center at the point of intersection of the axes of the journals H and the axle shafts. The pinions G and G' are also provided with spherical outer surfaces of the same radius so as to lie in contact with the housing members. Also the opposite end furcations of the bifurcated members H' and H² have spherical surfaces fitting against the spherical inner surface of the housing members.

With the construction as above described whenever the driven axles are rotating at different speeds the pinions G and G' will travel around the gear wheels F and F', while at the same time torque will be transmitted from the housing D through the shaft I, bifurcated members H' and H², journals H and pinions differentially to said gear wheels. Due to the fact that the journal bearings G² are eccentrically disposed, the lever arms formed by the pinions will be alternatively lengthened and shortened so as to correspondingly increase and decrease the torque transmitted. Thus if traction of one of the axle ground wheels is less than that of the other the torque transmitted thereto will be periodically diminished to prevent skidding of the wheel on the pavement or ground.

One important feature of applicant's construction is that there are no sliding surfaces other than the journals and journal bearings through which torque is transmitted. This will lessen wear of parts and also the structure is one having greater strength in the torque transmitting members. Another advantage is that there are comparatively few parts all of which are easily manufactured. The housing members D' and D² have a stepped engagement D⁵ with each other and are secured by bolts J. A spacer K transversely apertured to be sleeved upon the shaft I is arranged between the gear wheels F and F' and the ends of the axle shafts engaging said gear wheels.

What I claim as my invention is:

1. A differential gearing comprising a closed housing member having a segmental spherical inner surface, oppositely facing spaced bevel gear wheels mounted within said housing in axial alignment with each other, a pair of bevel pinions between and intermeshing with said gear wheels on diametrically opposite sides of the latter, each of said pinions having an eccentrically disposed aperture therein forming a journal bearing with its axis intersecting the axis of rotation of said pinions in a common point of the axis of said gear wheels, a shaft extending centrally between said gear wheels diametrically across said housing and secured thereto, and bifurcated members pivotally engaging said shaft with their furcations adjacent to and interengaging each other the outer end furcation of each bifurcated member being spherical to fit against said segmental spherical surface of said housing, each of said bifurcated members having a journal portion the axis of which is perpendicular to the axis of said shaft and which engages the journal bearing of the corresponding pinion, said pinions having segmental spherical outer surfaces of the same radius as said a segmental spherical inner surface and centered in the axis of said gear wheels.

2. A differential gearing comprising a closed housing formed of complementary half members having a stepped engagement with each other and a segmental spherical inner surface, oppositely facing spaced bevel gear wheels mounted within said housing in the respective half members thereof and in axial alignment with each other, pinions between and intermeshing with said gearing wheels each having an eccentrically disposed cylindrical aperture therein forming a journal bearing with its axis intersecting the axis of rotation of said pinion at a common point in the axis of said gear wheels, a shaft extending diametrically across said housing in the meeting plane of the complementary sections thereof, bifurcated rockable members pivotally engaging said shaft and having the furcations thereof adjacent to each other of a combined length to extend completely across the space within said housing, and a cylindrical journal portion on each of said bifurcated members with its axis perpendicular to the axis of said shaft, said journal portions engaging the cylindrical journal bearings of the respective pinions said pinions having segmental spherical outer surfaces of the same radius as said segmental spherical inner surface and centered in the axis of said gear wheels.

FRED F. MILLER, Jr.

REFERENCES CITED

The following references are of record in the file of this patent:

UNITED STATES PATENTS

| Number | Name | Date |
|---|---|---|
| 1,888,656 | Boynton | Nov. 22, 1932 |
| 2,067,952 | Scurlock | Jan. 19, 1937 |
| 2,392,441 | Wildhaber | Jan. 8, 1946 |

FOREIGN PATENTS

| Number | Country | Date |
|---|---|---|
| 478,096 | Great Britain | Jan. 12, 1938 |